Patented Oct. 4, 1927.

1,644,258

UNITED STATES PATENT OFFICE.

EDWARD LYONS, OF DETROIT, MICHIGAN, ASSIGNOR TO PARKE, DAVIS & CO., OF DETROIT, MICHIGAN, A CORPORATION OF MICHIGAN.

THIOGLYCOLLIC ACID COMPOUND.

No Drawing. Application filed May 3, 1926. Serial No. 106,553.

The invention relates to the preparation of certain new organic lead compounds which are especially valuable pharmacologically because of their low toxicity. These compounds are derived from the union of salts of lead such as the chloride, nitrate, hydroxide etc. with organic sulphur compounds, particularly the thio acids such as thioglycollic acid ($HSCH_2COOH$).

As a specific example of one of the new series of compounds I have represented below the probable structural formula of lead thioglycollate,

where M represents hydrogen, sodium or other metal which can replace hydrogen.

The substance indicated above when in the form of its sodium salt is golden yellow in color. It is very soluble in water and gives an alkaline reaction (towards phenolphthalein). Dilute acids precipitate the acid substance which again dissolves in alkali. Concentrated acids decompose the compound.

The following method may be used in the preparation of the new compounds.

To two molecular equivalents of thioglycollic acid in an equal volume of water, sodium carbonate is added to make the sodium salt. This is then treated with one molecular equivalent of lead hydroxide. The hydroxide dissolves at once and heat is applied to prevent precipitation. The reaction mixture is next filtered into a large volume of a suitable organic precipitant, such for example as methyl alcohol. Ether is then added to complete the precipitation. The precipitate is removed from the mixture in the usual manner and when dried appears as a light golden yellow powder, having a lead content of about 46%, whereas the theoretical content according to the formula above is 47.83%. By redissolving in water and reprecipitation as described above or by conversion to the acid substance, redissolving carefully in sodium hydroxide and precipitation or by evaporation to dryness a practically pure substance is obtained.

While in the above description I have mentioned specifically the sodium salt of lead thioglycollate it is to be understood that my invention also includes other homologous compounds derived from lead and the thio acids which come within the scope of the claims appended hereto.

What I claim as my invention is:

1. An organic lead compound derived from the action of thioglycollic acid and a lead compound.

2. An organic lead compound derived from the action of a thioglycollate and freshly prepared lead hydroxide.

3. An organic lead compound containing lead and the thioglycollic acid radical ($SCH_2COOM$) where M is hydrogen, sodium or other metal that can replace hydrogen.

4. An organic lead compound derived from the action of thioglycollic acid and a lead compound, said compound possessing the probable structural formula $Pb(SCH_2COOM)_2$ where M is hydrogen, sodium or other metal which can replace hydrogen.

5. As a new composition of matter, the substance represented by the following structural formula

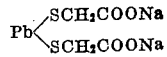

said substance being of golden yellow color, soluble in water, and alkaline in reaction towards phenolphthalein.

6. The process of preparing a lead compound of thioglycollic acid which consists in treating thioglycollic acid with freshly prepared lead hydroxide in the presence of sufficient alkali to form the sodium salt of the compound, and precipitating the organic lead compound from the solution.

In testimony whereof I affix my signature.

EDWARD LYONS.